(12) United States Patent
Zhang (10) Patent No.: US 7,882,261 B2
(45) Date of Patent: Feb. 1, 2011

(54) METHOD AND APPARATUS FOR REALIZING POSITIONING PLAY OF CONTENT STREAM IN PEER-TO-PEER NETWORK

(76) Inventor: Yongmin Zhang, Room 402, Block 7, Bijia Village, Meigang Road, Futian District, Shenzhen, Guangdong (CN) 518000

( * ) Notice: Subject to any disclaimer, the term of this patent is extended or adjusted under 35 U.S.C. 154(b) by 219 days.

(21) Appl. No.: 12/297,707

(22) PCT Filed: Apr. 21, 2006

(86) PCT No.: PCT/CN2006/000768

§ 371 (c)(1),
(2), (4) Date: Oct. 20, 2008

(87) PCT Pub. No.: WO2007/121610

PCT Pub. Date: Nov. 1, 2007

(65) Prior Publication Data

US 2009/0240833 A1    Sep. 24, 2009

(51) Int. Cl.
*G06F 15/173* (2006.01)
(52) U.S. Cl. ..................................... 709/236
(58) Field of Classification Search ............. 709/236, 709/231
See application file for complete search history.

(56) References Cited

U.S. PATENT DOCUMENTS

| | | | | |
|---|---|---|---|---|
| 7,234,064 B2* | 6/2007 | Menschik et al. | ........... | 713/193 |
| 7,418,470 B2* | 8/2008 | Howard et al. | ........... | 709/201 |
| 7,426,554 B2* | 9/2008 | Kennedy | ........... | 709/223 |
| 7,523,505 B2* | 4/2009 | Menschik et al. | ........... | 726/26 |
| 7,536,334 B1* | 5/2009 | Daughtery, III | ........... | 705/36 R |
| 7,552,192 B2* | 6/2009 | Carmichael | ........... | 709/217 |
| 7,587,508 B2* | 9/2009 | van Oldenborgh et al. | ........... | 709/231 |
| 7,593,333 B2* | 9/2009 | Li et al. | ........... | 370/232 |
| 7,725,832 B2* | 5/2010 | Cadiz et al. | ........... | 715/736 |
| 7,730,121 B2* | 6/2010 | Howard et al. | ........... | 709/201 |
| 7,733,808 B2* | 6/2010 | Hu et al. | ........... | 370/256 |

\* cited by examiner

*Primary Examiner*—David Y Eng
(74) *Attorney, Agent, or Firm*—Global IP Services; Tianhun Gu (57) ABSTRACT

A method of content transmission in peer-to-peer network includes the following steps: dividing contents to be transmitted into a plurality of stripes in time sequence (101); establishing one or more than one group(s) for clients which request for transmission contents from same stripes (102); a source divides the requested content into a plurality of blocks and marks each content block (104); determining which content block will be transmitted first in an stripe requested by one group; from the determined content block beginning, transmission it and its subsequent content blocks in succession to part or all members in the group respectively (105); and controlling that the member received the content blocks from the source retransmits the content to other members in its own group (106). The invention realizes positioning play in multicast mode for the clients using a P2P technology.

17 Claims, 5 Drawing Sheets

Figuire 5

Figure 6

METHOD AND APPARATUS FOR REALIZING POSITIONING PLAY OF CONTENT STREAM IN PEER-TO-PEER NETWORK

FIELD OF THE INVENTION

The invention relates to computer network, more particularly to a method and apparatus for realizing positioning play of content stream in multicast mode in peer-to-peer network.

BACKGROUND OF THE INVENTION

Usually, positioning play is utilized in the process of stream media playing, which means a media player can play content from a certain point (for example, when playing a file, shifting the locating pointer to the required point which will be played from in the file).

In single-cast mode, the positioning play may be best supported since there is a receiving stream corresponding to each receiver. However, in multicast mode, it is very hard to utilize positioning play function since the playing point required by each receiver may be different. In that case, it may not support the positioning play function in traditional multicast (broadcasting) mode, instead that this function may be available only in VOD service.

Another problem is that, it is universally necessary to play back earlier content; for example, people often want to watch news one hour ago or sports programs 30 minutes ago. The prior solution is that live programs are converted and saved as VOD contents for users using. The disadvantage of this method lies in the playing sometimes is lagged and it is inconvenient to be operated. An improved solution lies in Time-Shifted TV, i.e., when playing TV program in real time, the programs are stored, and in this way users can watch the live TV programs on demand via a menu. However, this improvement cannot be applicable in multicast (broadcasting) peer-to-peer network environment.

BRIEF SUMMARY OF THE INVENTION

The main purpose of the present invention is to solve the problem of prior art by providing a method and apparatus for realizing positioning play of content stream in peer-to-peer network, which enables the positioning play of stream media in multicast mode (broadcasting) by using P2P technology.

In order to achieve the mentioned goals, the present invention discloses a method for realizing positioning play of content stream in peer-to-peer network. The adopted technical scheme is: to divide the content starting from a point requested by users into a plurality for stripes, and then group these stripes into relatively independent $p_2p$ multicasting streams.

Steps that the present invention adopts to solve the mentioned technical problem are as follows:

A1. dividing the content to be transmitted into a plurality for stripes related to time;

B1. establishing one or more groups for clients who request for transmission the content started from the same stripe;

C1. the source divides the content requested for transmission into a plurality of blocks and marks each content block;

D1. determining which block will be transmitted first in a stripe requested by one group;

E1. From the determined content block beginning, transmission it and its subsequent content blocks in succession to part or all members in the group respectively, and controlling that the member received the content blocks from the source retransmits the content to other members in its own group.

In step B1, which stripe the start point of the content requested by the client belongs to is determined through one of the following steps:

B11. determining which stripe will be accessed first by adding the current moment requested for transmission by the clients to a certain time offset;

B12. determining which stripe will be accessed first by adding the start moment of transmission content to a certain time offset;

B13. determining which stripe will be accessed first according to absolute time length;

B14. determining which stripe will be accessed first according to a name of the content or catalog of the program selected by the clients.

The time offset may be inputted by the users and one preferable input method is that it is selected by using a progress bar.

When users log in, they should be attached with a content-related position. The related position is selected by users through a plurality of methods as mentioned above.

Normally, the source transmits contents to one group at a fixed average rate.

Wherein, following steps are also included: if the content transmission isn't finished after any group finished the content block transmission in a stripe, then the group continues to transmit the content blocks in next stripe.

The interval t for the stripes and the number n for the stripes are predetermined values.

According to a further preferred development, one or two of the interval t for the stripes and the number n for the stripes may be vary with the length of content or may be constant.

According to a further preferred development, when a new client wants to access to the system, it may be added to the transmission group through following steps:

A2. When the new client requests for transmission the content starting from a certain stripe, determining if there is a transmission group that transmits content from the stripe. If no, then execute step B2, and if yes, then execute step C2:

B2. Establishing a new transmission group for the stripe, and add the new client to the group;

C2. Adding the new client to existing transmission groups for the stripe.

Besides, the new client may also be added into the transmission group through following steps:

A2'. Setting a threshold value for each stripe;

B2'. When a new client requests for transmitting the content started from a certain stripe, determining if there is a transmission group that transmits content from the stripe. If no, then step E2 may be executed, and if yes, then checking whether the progress value of the content which has been transmitted from the stripe beginning is bigger than the threshold value, if it is bigger than or equal to the threshold value, then executing step C2'; if it is smaller than the threshold value, then execute step D2'.

C2'. Adding the client into the group which is transmission the content starting from the stripe;

D2'. Adding the client into the group which is transmission the content starting from the last stripe;

E2'. Creating a new transmission group for the stripe, and adding the new client into this group.

The P2P content transmission may be carried out in unit for stripe after the clients has accessed to a certain stripe. An embodiment of P2P transmission includes: the content is divided into blocks, the content blocks are transmitted to a plurality of members and the members retransmit the received content blocks to other members.

Members for a same stripe are divided into one or more groups. In this article, group is referring to a group of members or nodes. In operation, on the purpose of decreasing the demand on bandwidth of the source and enhancing P2P efficiency, it is preferred that the group isn't created for the user who just access to the system. The new client will be added into existing proper groups instead and new groups may be established only if there is no such proper group.

Groups for the stripe mentioned above may access to next stripe with time going. In the same way, since the time span of each stripe may be small, in order to receive content within current stripe completely, the client can access to the last stripe in advance when requesting for the content of current stripe.

For achieving the aims mentioned above, an apparatus for realizing positioning play of content stream in peer-to-peer network is disclosed in the present invention, in which, it comprises: client-accessing module, for monitoring the login and connection state of clients; stripe-dividing module, for dividing contents to be transmitted into a plurality for stripes related to the time; group-generating module, for establishing one or more group(s) for the clients which request for transmission the content starting from the same stripe; content-dividing module, for dividing the content to be transmitted into a plurality of blocks and marking each content block; determination module, for determining which content block will be transmitted first in an stripe requested by one group; P2P transmission module, for transmitting the determined content block and its subsequent content blocks in succession to part or all members in the group respectively, and controlling that the member received the content blocks from the source retransmits the content to other members in its own group.

The apparatus further comprises: a stripe-determining module, for determining which stripe will be accessed first by adding the current moment requested for transmission by the clients to a certain time offset or a name of the content or catalog of the program selected by the clients.

Wherein, the group-generating module further includes a related group-establishing unit and a related group-adding unit. According to the determination for the stripe-determining module, the related group-establishing unit establishes a new transmission group and adds the client for sending a new request of transmission to the newly established group, if there is no transmission group for this stripe. According to the determination for the stripe-determining module, the related group-adding unit adds the client for sending a new request of transmission to the newly established group, if there is a transmission group.

For realizing positioning play of P2P, some other modules are further included, which together form the system for realizing positioning play of content stream in peer-to-peer network. The system includes: a stripe-dividing module, a client-accessing module, a p2p transmission group establishing or adding module, information presenting and location selecting module, a P2P transmission module, an user login module and a content processing module. The system consists of more than two devices on P2P network, thus the modules are disposed among a group of devices, and a single device may only execute partly. For example, a login server consists for the stripe dividing module, the client-accessing module and the p2p transmission group establishing or adding module; a content server consists of the P2P transmission module; the servers usually called consists of the login server and the content server; the client consists of the P2P transmission module, the message presenting and location selecting module, the user login module and the content processing module.

In order to achieve the mentioned goals, the invention also discloses a computer-readable storage medium having stored a computer executable program thereon, in which the program is executed by a computer to accomplish the following functions:

Dividing the content to be transmitted into a plurality for stripes related to time;

Establishing one or more groups for clients who request for transmission the content started from the same stripe;

The source divides the content requested for transmission into a plurality of blocks and marks each content block;

Determining which block will be transmitted first in a stripe requested by one group;

From the determined content block beginning, transmission it and its subsequent content blocks in succession to part or all members in the group respectively, and controlling that the member received the content blocks from the source retransmits the content to other members in its own group.

The beneficial effects of present invention lie in that: it realizes the function of watching on demand in multicast mode for the clients using P2P technology through dividing the content to be transmitted into a plurality for stripes (e.g. a number Z of stripes) related to time, and establishing one or more groups for the clients which request for transmitting the content starting from the same stripe and its subsequent content to groups for the same requesting stripe and the members can exchange the content blocks each other.

Various advantages, aspects and novel features of the present invention, as well as details of illustrated embodiments thereof, will be more fully understood from the following description and drawings.

BRIEF DESCRIPTION OF THE DRAWINGS

FIG. 5 is a progress bar displayed on the client in accordance with an embodiment of the present invention.

EMBODIMENTS OF THE INVENTION

Figure 1:
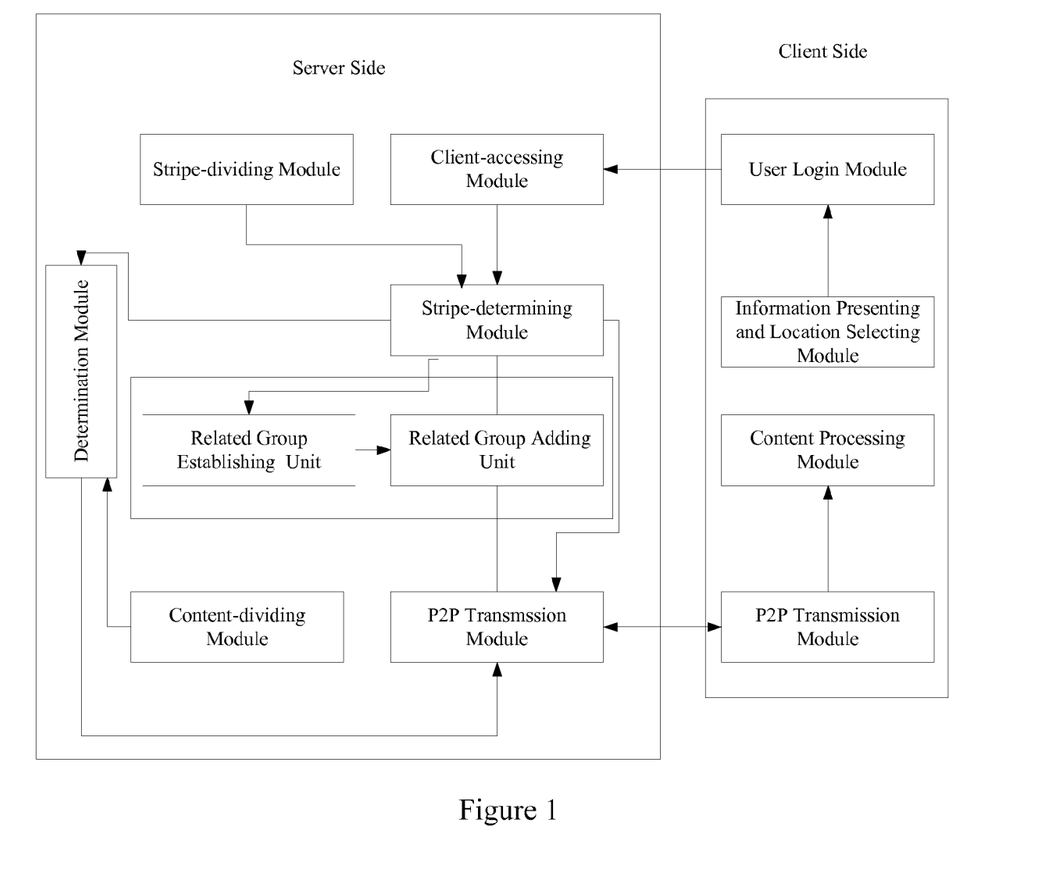
FIG. 1 is a structure block diagram in accordance with an embodiment of the present invention.

In one embodiment, as shown in FIG. 1, it is a structure diagram of content transmission between a server side and a client side of the invention. On the server side, a stripe dividing module may divide the content to be transmitted into a plurality for stripes related to the time and a content block dividing module may divide the content to be transmitted into a plurality of content blocks. The clients can log in the server through a user login module, a user accessing module in the server side may be used to detect the connection state (e.g. login, disconnection and connection quality). When a client's login is detected, according to the state of the client detected by the user accessing module, it is determined that which stripe the start point of the content requested by the client belongs to. A group-generating module is used for establishing one or more group(s) for the clients who request for transmission the content starting from the same stripe. At least one client, i.e. at least one member or member node, is included in each group. A group-generating module comprises a related group-establishing unit and a related group adding unit. If there is no transmission group for this stripe, the related group-establishing unit establishes a new transmission group and adds the client to the newly established group. If there is a proper transmission group, the related group adding unit adds the client to the proper group for the stripe. According to the stripe which the content requested by the clients belongs to and the content block corresponding the stripe determined by a stripe-determining module, a determination module determines which content block will be transmitted first in an stripe requested by one group. The requested content block may be transmitted to the clients through a P2P transmission module. The content block may be received by the client through a P2P transmission module thereon and processed further by a content processing module.

Additionally, a control dataset establishing and maintaining module may also be included which is used to establish control dataset for recording properties of each client in the group. The control dataset at least comprises essential data for communication between each client. In addition, transmission state of the clients, group property and marks indicating changes of the control dataset may also be comprised in the control dataset. The control dataset refers to a table of information about the clients, which comprises the data and state related to communication of each client, herein control strategy data may also be comprised. The control dataset may be transmitted to the clients via a control dataset transmission module. The transmission can be achieved through dividing the control dataset into a plurality of blocks by a content block dividing module and transmitting the divided control dataset to the clients through the control dataset transmission module. The clients of each group have a same control dataset, which is the control dataset of the group. According to the information detected by the user accessing module, the control dataset establishing and maintaining module may update the control dataset in real time and transmit updated control dataset to client side, when members in the group are changed (login or disconnection of the clients).

A content block dividing module may divide content on the source to be transmitted into a plurality of content blocks and mark these divided content blocks with block number. For example, when the content blocks are sent by the content transmission module, they are packaged with these related information and block number, so that the clients can recombine them to the original content after receiving the content blocks and detect the dropped blocks according to the block number. The content may be audio/video data, computer files, various instant messages or UDP data packages on network. The P2P transmission module transmits the content blocks to be transmitted in each stripe requested by each group respectively to part or all members of one or more groups for this stripe and controls that the members received the content block retransmit these content blocks to other members of its own group who request the content blocks based on the control dataset of the group.

The content to be transmitted can be divided into stripes related to the time by following steps:

1. If the content exists and the size of the content is fixed, then time interval t and number n for the stripes may be set as predetermined value.

2. If the content is live program, and the size of content may vary with the time going, then the time interval t can be set as a predetermined value and the stripe number n may vary with the size of content, or the stripe number n may be set as a predetermined value and the time interval t may vary with the size of the content.

3. The content may be divided into stripes related to the time according to the playing sequence based on a name of snippet and catalogue of program. Both the time interval t and stripe number n may be variable here.

According to the division method for the stripe, which stripe the start point of the content requested by the clients belongs to may be determined by one of the following methods:

1. Determining which stripe will be accessed first by adding the current moment requested by the clients for transmission to a certain time offset, in which, the time offset is negative, that is to say the program should be played from the previous moment. For those live programs, the start time may not always be accurate or significant, so in actual implementation the time offset shifted forward is adopted. For example, the start time for transmission requested by a client is T1 and the client want to receive the content which starts from 20 minutes ago to the end, If the time interval between each stripe is 5 minutes and the time span of each grid on the progress bar displayed on the client is 5 minutes correspondingly, then the client should shift the pointer forward 4 grids from the login point on the progress bar.

2. Determining which stripe will be accessed first by adding the content start time to the time offset. This method is most applicable to those determined programs (e.g. VOD). For example, the content requested by the clients covers the time span from the point of the program after 10 minutes to the end of the program. If the time interval between each stripe is 5 minutes and the time span of each grid of the progress bar displayed on the client is 5 minutes correspondingly, then the client should select the third grid.

3. Determining which stripe will be accessed first by absolute time. For example, at 8:00 the clients want to watch the program starting from 7:30 in some channel.

4. Determining which stripe will be accessed first by the content name or program catalog selected by the client. The content is divided into a plurality for stripes, the contents starting to be played from certain stripes may be selectively converted into program items. The clients may choose the presented program items to access to the corresponding stripes. Each grid of the progress bar displayed on the clients corresponds to a chapter or an entry of the program and the client may select the corresponding grid according to the chapter or section to be transmitted.

In the fourth method, each program item may be arranged in a stripe, this arrangement makes the time span of each stripe different. Alternatively, the time span of each stripe may be set as a same value, in this way, programs will be arranged in one or more stripe(s).

The clients can access to a certain stripe by inputting time offset, in which, the input of time offset is accomplished by operating a progress bar. The progress bar may be divided into n grids corresponding to n stripes of the content. For determined programs, the clients can access to certain stripes by clicking the n grids. For live programs, the clients can access to certain stripes only by clicking the stripes which has been played. Therefore, it may be understood in some circumstance, that the number n for stripes may be increased with the extension of the content length.

The progress bar may also be applicable to the fourth method, in which, each grid corresponds to one stripe. Only if the time span of each stripe is set as a same value, the number of the grids on the progress bar is proportional to time unit.

According to the grids on the progress bar chosen by clients, which one for the stripes requested by the clients is transmitted first is determined. If the stripe requested by the clients to be transmitted first is the same, then the clients may be divided into one or more groups. These groups may belong to the same requested stripe and become a transmission group for the stripe.

Figure 2:
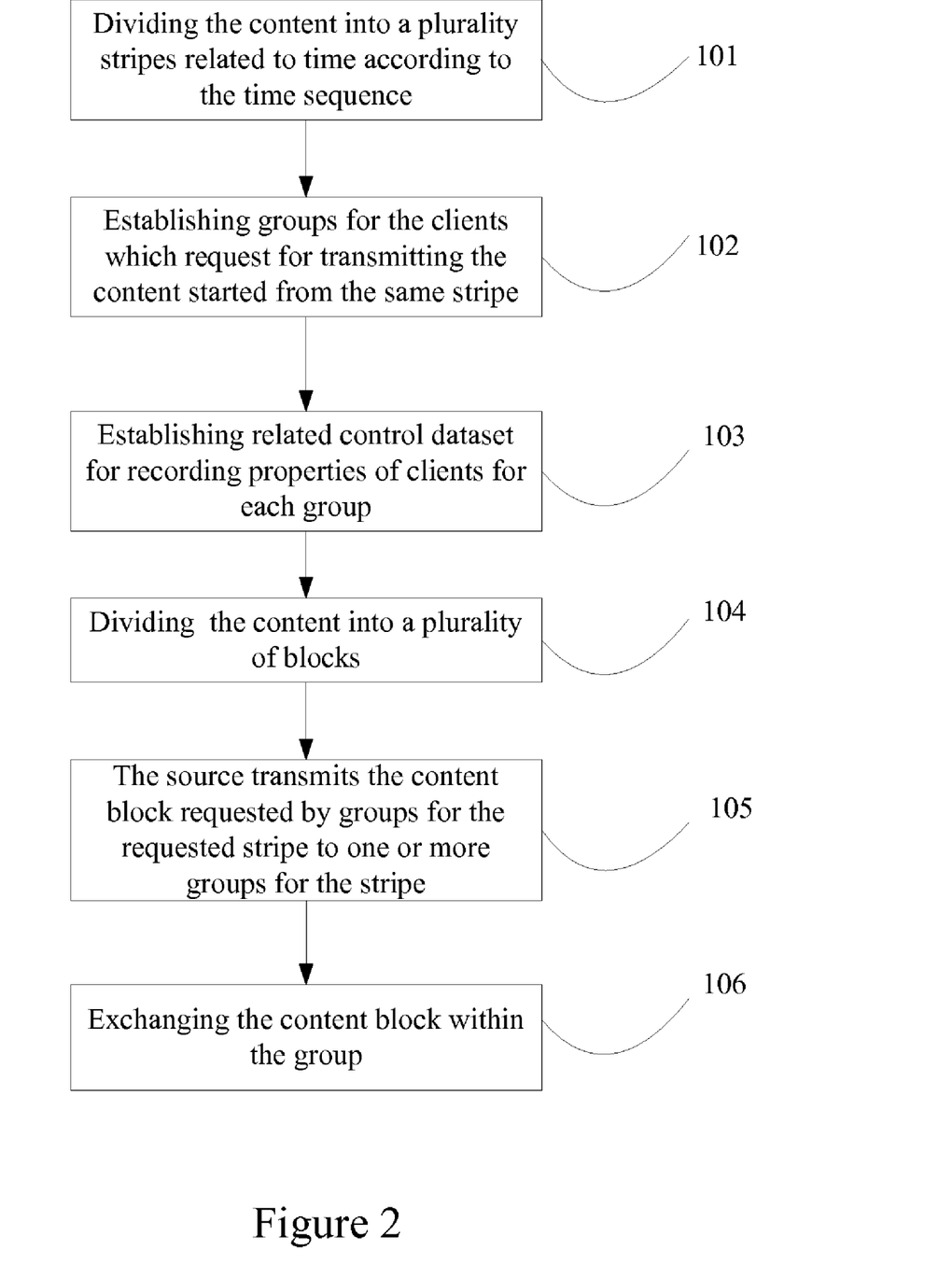
FIG. 2 is a flow chart in accordance with an embodiment of the present invention.

A flow diagram is shown as FIG. 2 which comprises following steps:

In step 101, the content to be transmitted into a plurality for stripes related to the time is divided, and then step 102 is executed;

In step 102, one or more groups for clients which request for transmission the content started from the same stripe is established, then step 103 is executed;

In step 103, the control dataset for recording properties of each client in the group for each group is established, in which the control dataset at least comprises essential data for communication between each client, additionally comprises transmission state of the clients, group property and marks indicating changes of the control dataset, then step 104 is executed;

In step 104, the source divides content to be transmitted into a plurality of blocks and marks the blocks accordingly, and then step 105 is executed;

In step 105, the blocks requested by groups for each requesting stripe are respectively transmitted to the part or all members in the group continuously, then step 106 is executed;

In step 106, the members which have received blocks from the source are controlled to retransmit the blocks to other members in their own groups according to the control dataset.

The step 104 mentioned above may be executed before step 101, step 102 or step 103, on the condition that the operation of the content-dividing block is finished before the transmission.

Figure 3:
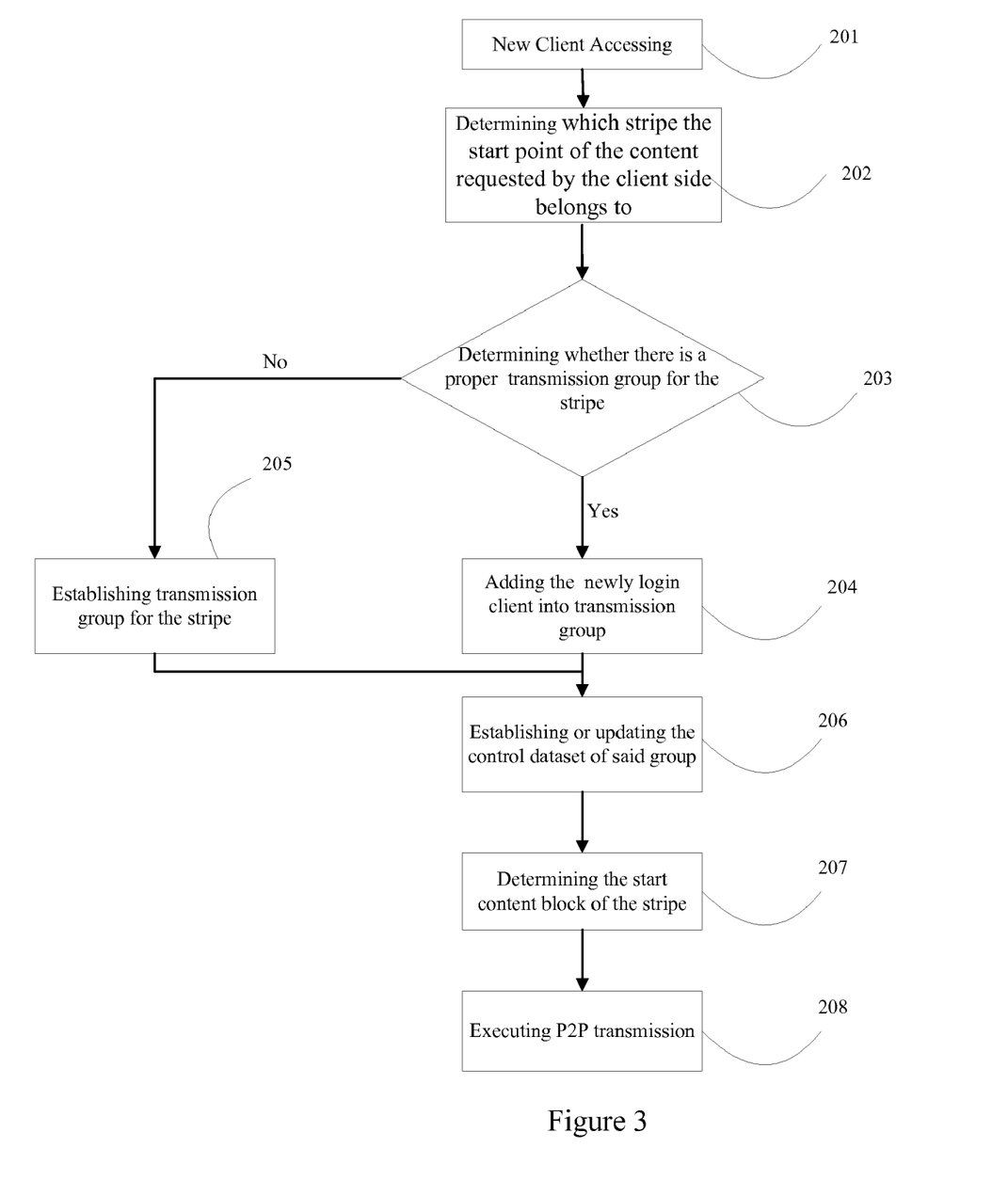
FIG. 3 is a flow chart of an exemplary process of new client login in accordance with an embodiment of the present invention.

The server may execute the following steps when there are new clients logging in, as shown in FIG. 3:

In step 201, the successful login of a new client is detected, and then step 202 is executed;

In step 202, which stripe the clients will access to first, i.e. which stripe the start point of the content requested by the client side belongs to is determined by the stripe-determining module according to the progress bar chosen by the user of the client side, then step 203 is executed;

In step 203, whether there is P2P transmission group for the stripe is determined. If there are P2P transmission groups then step 204 is executed, or skipped to step 205;

In step 204, the newly login client may be added into P2P transmission groups for the stripe then step 206 is executed;

In step 205, a P2P transmission group which transmits the content started from this stripe is established and the clients are added into the newly established group, then step 206 executed;

In step 206, for existing P2P transmission group, the control dataset is updated and for newly established transmission groups new control dataset is established, then step 207 is executed;

In step 207, the content blocks corresponding to the span starting from the beginning for the stripe to the last stripe are determined, then step 208 is executed;

In step 208, the determined content blocks are transmitted to part or all clients within group in rough order by using P2P transmission. Normally, the source may transmit the content at a fixed average rate.

In the second embodiment of the invention, when a new client has finished the process of login, the transmission group for the stripe requested by the client may have transmitted content for a while, even the transmission may come to an end. In that case, in the present embodiment, the following improvement has been made based on the first embodiment:

The transmission state of the transmission groups for each stripe is detected continuously, when a group of clients finished the transmission of the content blocks in a stripe. If the transmission of the content has not completed, then the transmission may continue to the next stripe. Supposing that the transmission group Q for stripe N has finished the transmission of the content block corresponding to the stripe N, if the transmission of the content still continues, then the transmission group Q may access to stripe N+1 to continue transmitting the content block corresponding to stripe N+1.

Figure 4:
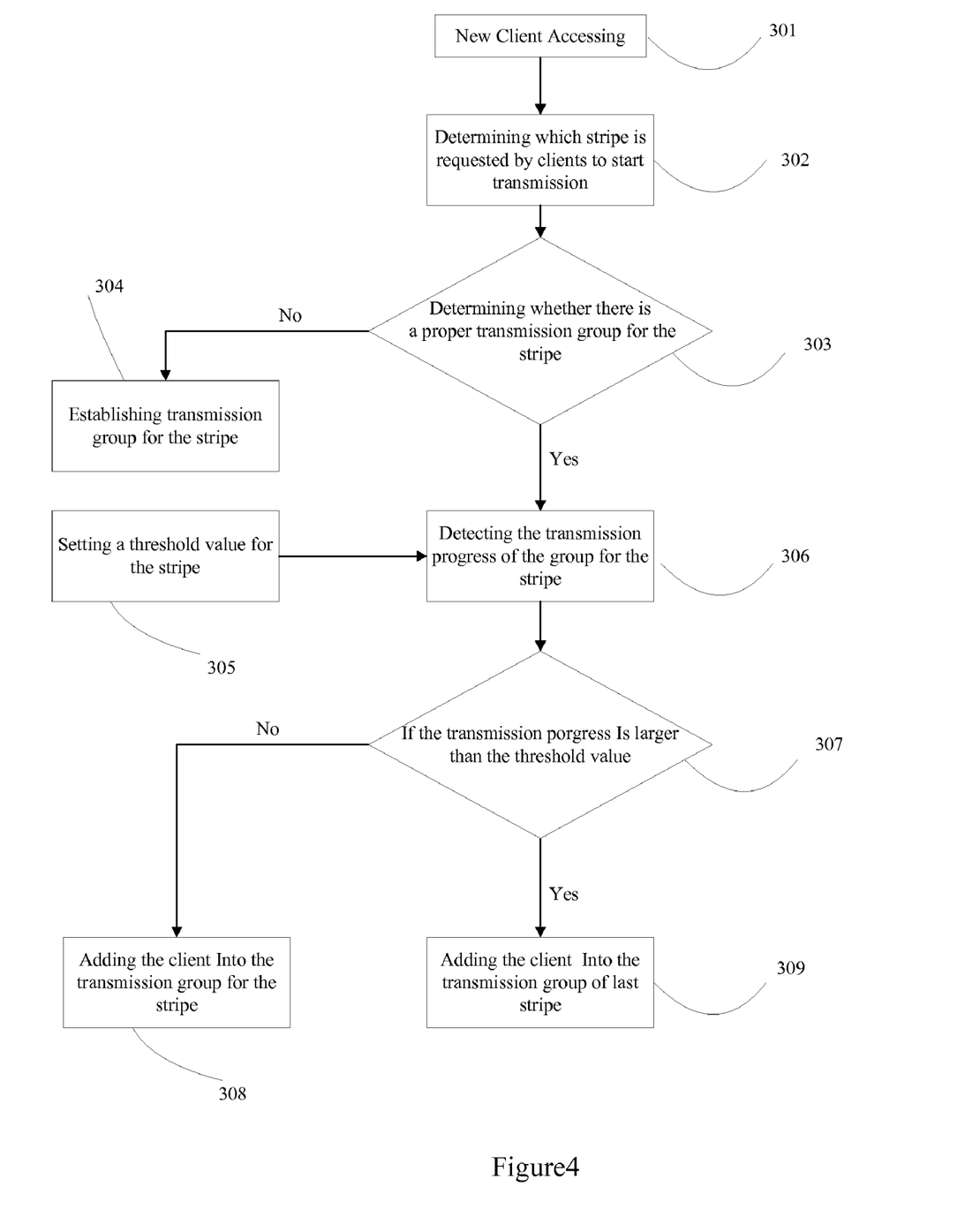
FIG. 4 is a flow chart of an exemplary process of new client adding into a group in accordance with another embodiment of the present invention.

Further improvements on stripes to which newly login clients will access are also made. Because sometimes transmission groups for the stripe requested by the client t have transmitted part of the content blocks corresponding to the stripe, if the newly login clients has been added into transmission groups for the stripe, then the newly login clients may not obtain the beginning part of the content block, which may result in the missing of content. In that case, a threshold value may also be set in the present embodiment through following steps, in which its flow is referred to FIG. 4:

In step 301, the successful login of a new client is detected, and then step 302 is executed;

In step 302, which stripe is accessed by clients or requested by clients to start transmission may be determined by stripe-determining module according to the progress bar chosen by clients on the clients, then execute step 303;

In step 303, determine whether there are P2P transmission groups within the stripe. If there are existing P2P transmission groups then execute step 306 or go to step 304;

In step 304, a P2P transmission group started from this stripe may be established and the client may be added into the newly established groups;

In step 305, a threshold value may be set for each stripe and step 306 will be executed when there are new clients to be added into the stripe;

In step 306, the rate of transmission progress of existing P2P transmission groups within the stripe may be detected and execute step 307;

In step 307, whether the rate of transmission progress of existing P2P transmission groups for the stripe is faster than or equal to the threshold value is determined. If the rate of transmission progress is faster than or equal to the threshold value then step 308 may be executed or step 309 will be executed instead;

In step 308, the newly login clients may be added into the existing P2P transmission groups for the stripe;

In step 309, the newly login clients may be added into existing P2P transmission groups for the last stripe, so as to enable the client to receive the content as much as possible and prevent the missing of content.

FIG. 5 shows a progress bar. Referring to FIG. 5, 402 is the beginning point; 406 is the location of playing; 404 between the beginning point and location of playing is the stripes which has been played; 410 is the end point; 408 between the end point and the location of playing is the stripes to be played. To those determined programs (e.g. VOD), any stripe can be selected to start the playing. However for those live programs, only stripes which have been played can be chosen.

Figure 6:
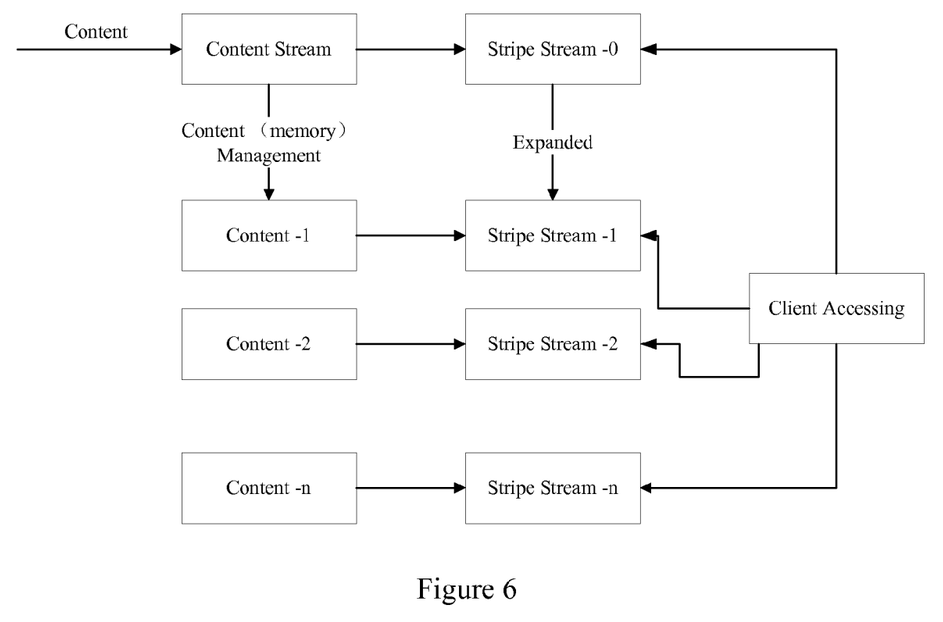
FIG. 6 is a schematic diagram of an exemplary process of content backup and transmission in accordance with an embodiment of the present invention.

The content playing server which supports P2P positioning play function can store the played content as the copy of the content for using in requesting the stripe while playing, if the content to be played has no copy. This function is most useful for those live programs since the positioning play of the time stripe can be achieved by storing the content which has been played. In FIG. 6, there is shown a content management unit, for storing the copy of content which has been played and dividing them into a plurality of time stripes for the use of requesting time stripe. For example, the content stream may be stored by the content management unit as content −1, content −2 . . . content −N. This stripe stream refers that the content may be continuously transmitted to one or more groups starting from a certain stripe and the content may be expanded to be stripe −1, stripe −2 . . . area −N with the increasing of the content. Clients may access to a proper stripe according to their requirement and request to transmit the content started from this stripe.

The modules mentioned above or working flow can be designed a program embedded in a computer including server computer.

The designed program according to the modules and the working flow mentioned above can be stored in an external readable storage, for example, floppy disk, CD-ROM, hard disk, magnetic tape recording media, IC semiconductor storage or other optical storage (e.g. DVD or PD) or magnetic recording medium. A server providing network connection can also be utilized as the machine-readable storage. The medium can also include electricity, light, sound or other forms of transmission signals (e.g. carrier wave, infrared signal digital signal etc.).

What is claimed is:

1. A method for realizing positioning play of content stream in peer-to-peer network comprising following steps:
   A1. dividing a content to be transmitted into a plurality of stripes relating to time;
   B1. establishing one or more groups for clients who request for a transmission of the content started from the same stripe;
   C1. a source divides the content requested for transmission into a plurality of content blocks based on catalog of the content and marks each content block;
   D1. determining which content block based on catalog of the content will be transmitted first in a stripe requested by one group;
   E1. transmitting the determined content block from the beginning thereof and subsequent content blocks thereof in succession to part or all members in the group respectively, and controlling that the members received the content blocks from the source retransmit the same to other members in a same group.

2. The method for realizing positioning play of content stream in peer-to-peer network according to claim 1, wherein in step B1, which stripe the start point of the content requested by the client belongs to is determined through one of the following steps:
   B11. determining which stripe will be accessed first by adding the current moment requested for transmission by the clients to a certain time offset;
   B12. determining which stripe will be accessed first by adding the start moment of transmission content to a certain time offset;
   B13. determining which stripe will be accessed first according to absolute time length;
   B14. determining which stripe will be accessed first according to a name of the content or catalog of the program selected by the clients.

3. The method for realizing positioning play of content stream in peer-to-peer network according to claim 2, wherein the time offset is selected through a progress bar on the clients.

4. The method for realizing positioning play of content stream in peer-to-peer network according to claim 3, wherein normally, the content may be transmitted at a fixed average rate from the source to one group.

5. The method for realizing positioning play of content stream in peer-to-peer network according to claim 1, wherein if the content transmission isn't finished after any group finished the content block transmission in a stripe, then the group continues to transmit the content blocks in next stripe.

6. The method for realizing positioning play of content stream in peer-to-peer network according to claim 5, wherein time interval t and number n for the stripe are predetermined values.

7. The method for realizing positioning play of content stream in peer-to-peer network according to claim 6, wherein one value or both value of the stripe time interval t and stripe number n may be changed with the length of content or may be a constant.

8. The method for realizing positioning play of content stream in peer-to-peer network according to any one of claim 5, wherein the method comprises following steps:
   A2. when a new client requests for transmission of a content starting from a certain stripe, determining if there is a transmission group that transmits the content from the stripe, if not, then execute the step B2, and if yes ,then execute the step C2 :
   B2. establishing a new transmission group for the stripe, and add the new client to the group;
   C2. adding the new client to an existing transmission group for the stripe.

9. The method for realizing positioning play of content stream in peer-to-peer network according to claim 5, wherein the method comprises following steps:
   A2'. setting a threshold value for each stripe;
   B2'. when a new client requests for transmission a content started from a certain stripe, determining if there is a transmission group that transmits content from the stripe, if not, then the step E2 may be executed, and if yes ,then check whether a progress value of the content which has been transmitted from the stripe beginning by the transmission is bigger than the threshold value, if it is bigger than or equal to the threshold value, then execute the step C2'; if it is smaller than the threshold value ,then execute the step D2'.
   C2'. adding the client into a group which is transmitting the content starting from the stripe;
   D2'. adding the client into a group which is transmitting the content starting from the last stripe;
   E2'. creating a new transmission group for the stripe, and adding the new client into this group.

10. The method for realizing positioning play of content stream in peer-to-peer network according to claim 1, wherein for each group the control dataset for recording properties of each client in the group is established, in which the control dataset at least comprises essential data for communication between each client, additionally comprises transmission states of the clients, group property and marks indicating changes of the control dataset.

11. The method for realizing positioning play of content stream in peer-to-peer network according to claim 10, wherein further including the following steps for maintaining the control dataset:

A3. a server detects states of connection, disconnection and communication of the clients which participate in the transmission and marks the changed control dataset:

B3. transmit an updated control dataset to each client through following steps:

B31. a server divides the changed part of the control dataset or variation of the control dataset into blocks based on the existing control dataset and transmits the blocks to part or all members within a group; the members may retransmit the blocks received from the server to other members within the group:

B32. if a member has no a previous control dataset, that the server may transmit the whole corresponding control dataset or the distortion of the corresponding control dataset to the member.

12. The method for realizing positioning play of content stream in peer-to-peer network according to claim 1, wherein a content playing server supporting P2P positioning play function can store the copy of the content while playing.

13. An apparatus for realizing positioning play of content stream in peer-to-peer network comprising:

a client-accessing module for monitoring login and connection state on client side;

a stripe-dividing module for dividing a content to be transmitted into a plurality of stripes relating to time;

a group-generating module for establishing one or more groups for client side which request for transmitting content from same stripe;

a content-dividing module for dividing a content to be transmitted into a plurality of blocks based on catalog of the content and marking each content block;

a determination module for determining which content block based on catalog of the content is transmitted first in a stripe requested by one group;

a P2P transmission module for transmitting the determined block and subsequent content blocks respectively to part or all members in the group in succession, and controlling that the members received the content blocks from the source side retransmit the content to the other members in their own group.

14. The apparatus according to claim 13, wherein the apparatus further comprises an stripe-determining module which enables a determination of certain stripe requested for starting the content transmission and the determination can be achieved based on a current time requested for transmission by client side plus time offset or the content start time plus time offset or the name or catalog of the content selected by the client side.

15. The apparatus according to claim 14, wherein the group-generating module further includes a related group-establishing unit and a related group-adding unit, according to the determination for the stripe-determining module the related group-establishing unit establishes a new transmission group and adds the client for sending a new request of transmission to the newly established group, if there is no a transmission group for this stripe, according to a determination of the stripe-determining module, the related group-adding unit adds the client for sending a new request of transmission to the newly established group, if there is a transmission group.

16. The apparatus according to claim 15, wherein further comprising a control dataset establishing and maintaining module and a control dataset transmission module, the control dataset establishing and maintaining module is used for establishing control dataset for recording properties of each client in the group, the control dataset at least comprises essential data for communication between each client, the control dataset may be transmitted to the clients via the control dataset transmission module.

17. A machine-readable storage medium having stored thereon a computer executable program carrying out a method to realize positioning play of content stream in peer-to-peer network comprising following steps:

A1. dividing a content to be transmitted into a plurality of stripes relating to time;

B1. establishing one or more groups for clients who request for a transmission of the content started from the same stripe;

C1. a source divides the content requested for transmission into a plurality of content blocks based on catalog of the content and marks each content block;

D1. determining which content block based on catalog of the content will be transmitted first in a stripe requested by one group;

E1. transmitting the determined content block from the beginning thereof and subsequent content blocks thereof in succession to part or all members in the group respectively, and controlling that the members received the content blocks from the source retransmit the same to other members in a same group.

* * * * *